Figure 1:
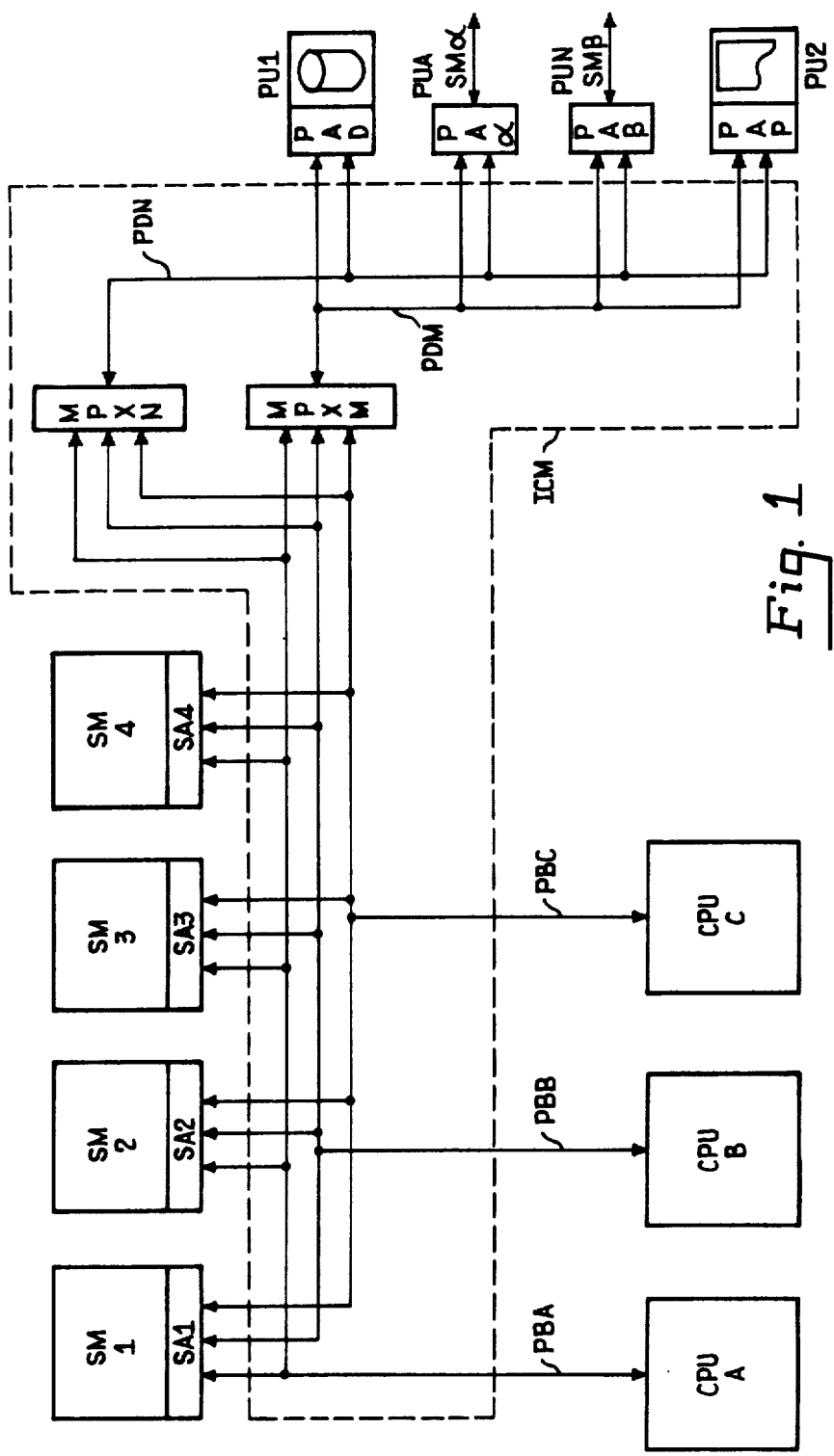

United States Patent [19]

Venton et al.

[11] 4,121,286

[45] Oct. 17, 1978

[54] DATA PROCESSING MEMORY SPACE ALLOCATION AND DEALLOCATION ARRANGEMENTS

[75] Inventors: Peter Charles Venton, Wimborne; Michael Blench, Maidenhead; Anthony Keith Sutherland, Reading; Kenneth James Hamer Hodges, Wimborne, all of England

[73] Assignee: Plessey Handel und Investments AG, Zug, Switzerland

[21] Appl. No.: 730,840

[22] Filed: Oct. 8, 1976

[30] Foreign Application Priority Data

Oct. 8, 1975 [GB] United Kingdom ............ 41139/75

[51] Int. Cl.² ........................................... G06F 11/00
[52] U.S. Cl. .................................. 364/200; 364/900
[58] Field of Search ... 364/200 MS File, 900 MS File, 364/200, 900

[56] References Cited

U.S. PATENT DOCUMENTS

| | | | |
|---|---|---|---|
| 3,778,776 | 12/1973 | Hakozaki | 340/172.5 |
| 3,902,163 | 8/1975 | Amdahl et al. | 340/172.5 |
| 3,949,379 | 4/1976 | Ball | 340/172.5 |
| 4,024,507 | 5/1977 | Berkling et al. | 340/172.5 |

Primary Examiner—Gareth D. Shaw
Assistant Examiner—C. T. Bartz
Attorney, Agent, or Firm—Fleit & Jacobson

[57] ABSTRACT

When a storage block is returned to the store allocator the master capability table (MCT) entry defining the block must also be deallocated. However, an arbitrary number of capability pointers to that block may still exist in the live system and these must be cancelled before the MCT entry is re-used. The cancellation operation ideally requires a system freeze which cannot be contemplated in a real-time environment. Accordingly each MCT entry includes a "garbage" bit and "visited" bit and the garbage bit is set each time a "load capability register" instruction is performed and a garbage collection process is used to detect blocks which can be freed. The garbage collection process involves (i) re-setting the garbage and visited bits of all MCT entries (ii) testing each MCT entry (iii) setting each visited bit for each tested MCT entry having its garbage bit set and (iv) setting the garbage bit in each MCT entry listed in a segment storing a list of segments and (v) marking for release only those segments whose garbage bits are in the second state when all visited bits of the segments storing list of segments have been set.

6 Claims, 9 Drawing Figures

DATA PROCESSING MEMORY SPACE ALLOCATION AND DEALLOCATION ARRANGEMENTS

The present invention relates to data processing systems and is more particularly concerned with arrangements for use in memory space allocation and deallocation.

In many present data processing systems, direct access memory space is allocated to an active process dynamically and all addressing of that memory space by the programs forming the process is achieved indirectly using relative addressing. This arrangement permits available memory spaces to be allocated to hold the segments of the active processes of the data processing system as required. Subsequently the memory space is deallocated for use with other segments of the other processes when all processes referencing a particular memory space are completed. Numerous list processing systems exist in the prior art utilising arrangements of the above type and typical of these is a system employing so-called "capabilities" as described in U.K. Pat. Ser. No. 1,329,721.

In the above mentioned system a so-called "system capability table" is provided in which "segment descriptors" comprising the base and limit addresses of all storage segments in the direct access store are held. Each active process is then allocated, when processing starts, at least one so-called "reserve segment pointer" table having one entry for each segment to which the process is permitted access. Each entry comprises an access type code together with a pointer value which is relative to the base address of the system capability table (S.C.T.). Accordingly in each system three types of segment may exist in the direct access store and these are (i) a program code segment, (ii) a data segment and (iii) a capability pointer segment.

The data processing system is organised such, that all direct access store operations are executed under the control of a store protection or so-called capability-register which resides in the computer accessing the store. Before access to a particular segment can be obtained therefore, the segment descriptor for that segment must be loaded into a capability register. The capability register loading operation uses the reserved segment pointer table and the system capability table to derive the information to be loaded into the selected capability register.

Due to flexibility of the capability mechanism and store allocation arrangements, it is possible that store segments may be finished with but because their capability pointers have been distributed among a number of processes they have no one "owner" process and accordingly there is no process which can have the responsibility of explicitly releasing that segment. In fact it is advantageous to arrange that all user processes are under no obligation to release any segment when a process has finished with a segment.

There are a variety of ways in which store segments can be implicitly released (i.e. the user process discards all capability pointers to the segment but does not explicitly release the segment). For example, if the only capability for a capability pointer segment is maintained by the user process in a capability register and the user process then reloads that capability register with a different segment descriptor then the original capability pointer segment can no longer be accessed by normal means since the only capability for the segment has been destroyed. Similarly, if none of the capabilities within the structure attached to the capability segment exists outside the structure then the act of overwriting the capability register means that none of the structure is accessible any longer. The store segments involved have not been released explicitly and hence they form "garbage" within the system. Such garbage may be termed "island garbage" since it forms an island which cannot be accessed by means of normal capability operations.

Although a user process may create garbage by overwriting pointers, the system capability table entry (SCT slot) that defines the segment cannot be affected by any operations of the user. Hence although the user has lost all access to any implicitly deallocated block of store the operating system may have knowledge of the block by using privileged access to examine the system capability table.

Hence a garbage collection problem exists since blocks of store may become isolated from the total system structure and it is required to search out such blocks and return the store blocks and SCT entries referencing them to the pool of free resources.

In addition there is a requirement for garbage collection on the SCT slots. This arises because a user process may release a block of store and may retain old pointers for the block. If the system reallocates the corresponding SCT entry and uses it for a new store block then the original process may use its old pointer to access the new block. Hence the SCT entry corresponding to a released block cannot be reused until it has been proven that no pointers exist within fast store for the SCT entry. This means that another aspect of garbage collection in the system is finding released SCT slots to which no pointers exist.

Garbage collection algorithms have been devised in the prior art and basically these algorithms require a node word for each segment in the fast access store and in each node word a "garbage mark bit" is provided.

The garbage collection process operates in two phases starting from a state in which all the mark bits are set, say to zero.

The first phase involves the scanning of all the node lists of the system starting from a root node in the operating system and, for each node encountered, in the scanning process, the mark bit therein is set to the '1' state. The second phase makes a sequential pass over the entire memory pool looking at the segment node words and all nodes having the garbage mark bit still reset are marked as free slots and the store segment defined by the node word can be released. Algorithms suitable for the achievement of garbage collection processes of the above type are disclosed in section 2.3.5. (pages 406 to 420) of the second printing of Volume One entitled "Fundemental Algorithms" in the book series entitled "The Art of Computer Programming" by Donald E. Knuth published in 1968 by Addison-Wesley Publishing Company.

The garbage collection algorithms disclosed in the above mentioned book may be applied to a list processing system of the type disclosed in U.K. Pat. No. 1,329,721 and in this case the node words correspond to the system capability table entries. However two aspects of the algorithms disclosed in the above reference make them unsuitable for use with a system embodying capabilities when that system is employed in a real time multiprocess environment. These aspects are:

(i) the algorithm requires a complete scan of the system capability table with the system frozen, and (ii) a straight forward scanning of the system capability table requires the use of a relatively long stack.

Considering firstly aspect (i), clearly the algorithm would break down if other processes were modifying their data structures at the same time as the garbage collection scan was being performed. Since the system is designed for a real time environment such considerations are unacceptable. Considering now aspect (ii), arrangements can be provided by modifying the nodes during the "downward" scan so that they contain "upward" pointers to the nodes already scanned. However such operations require modification of the system capability table entries or capability pointers during the garbage scan and accordingly would compromise the validity of the rest of the entry and hence make the capability arrangements of the system suspect.

It is an object of the present invention to overcome the above mentioned problems in a simple and inexpensive manner.

According to the invention there is provided a data processing system having at least one processor module and a memory having information stored in segments each segment storing data, program code or lists of segments and each segment has a status word including a garbage bit and a visited bit and the garbage bit is set to a first state each time a processor prepares to perform operations relative to the corresponding segment and a processor module is arranged to perform a sequence of operations to detect segments which can be freed and the sequence includes (i) the setting to a second state of the garbage and visited bits of all status words (ii) the testing of each status word (iii) the setting of each visited bit to the first state for each tested status word having its garbage bit in the first state and (iv) the setting to the first state of the garbage bit in each status word listed in an active segment storing a list of segments and indicating for release only those segments whose garbage bits are in the second state when all the visited bits of the active segments storing lists of segments are in the first state.

Figures 5, 6:
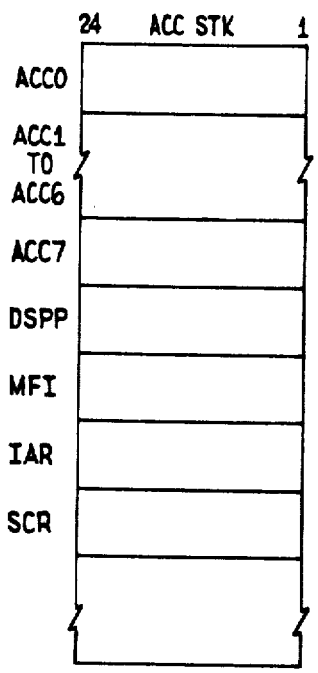
Figure 2:
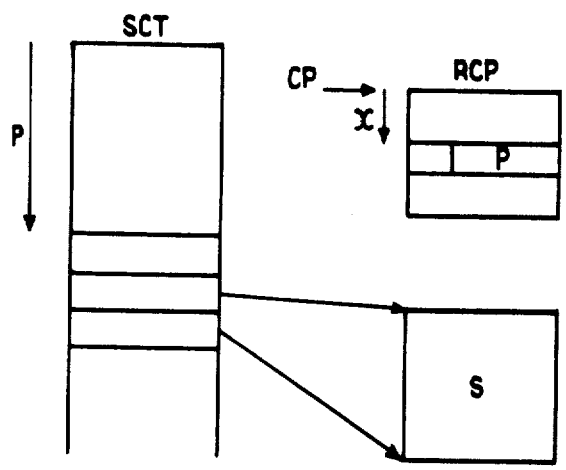
Figure 3:
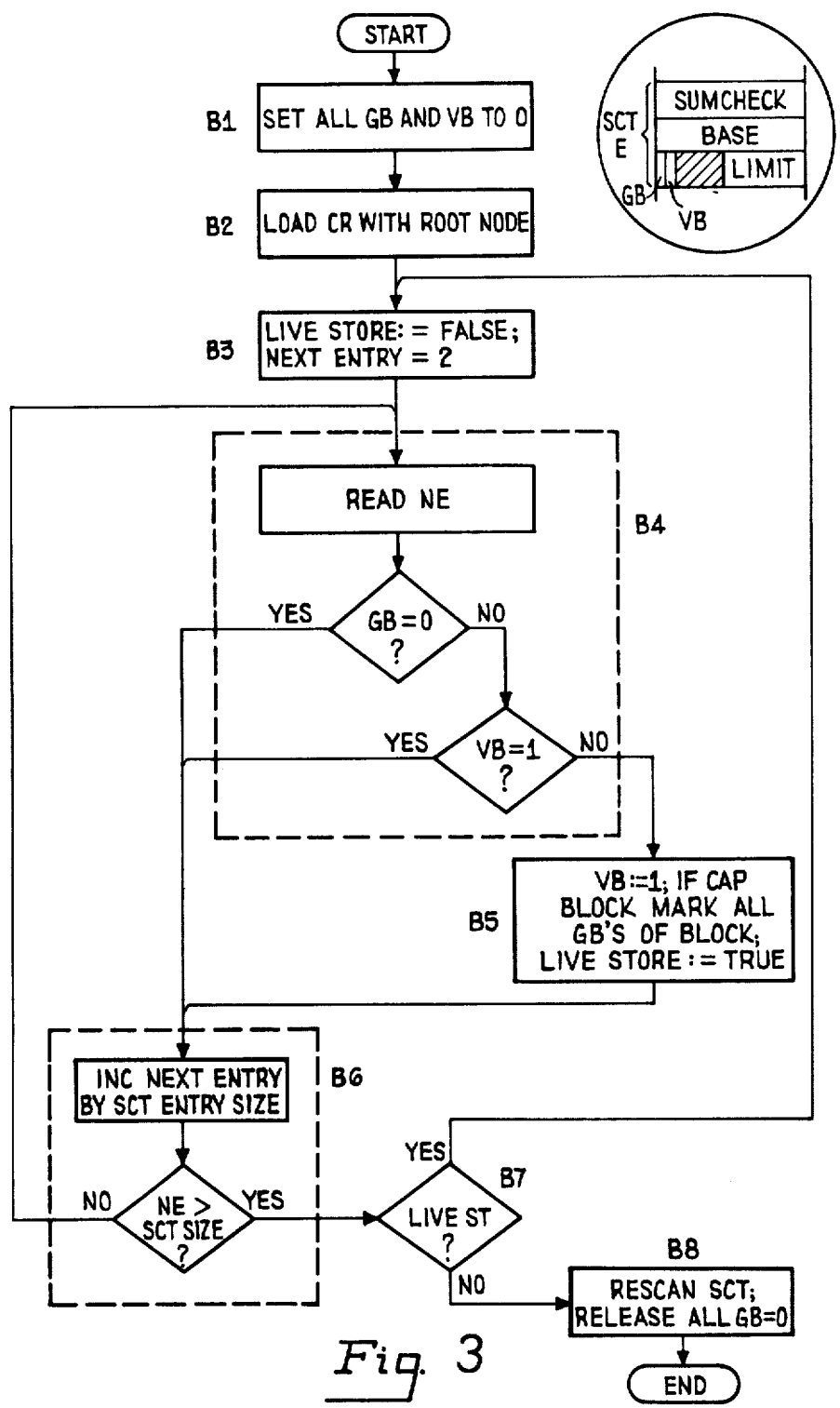
Figure 4A:
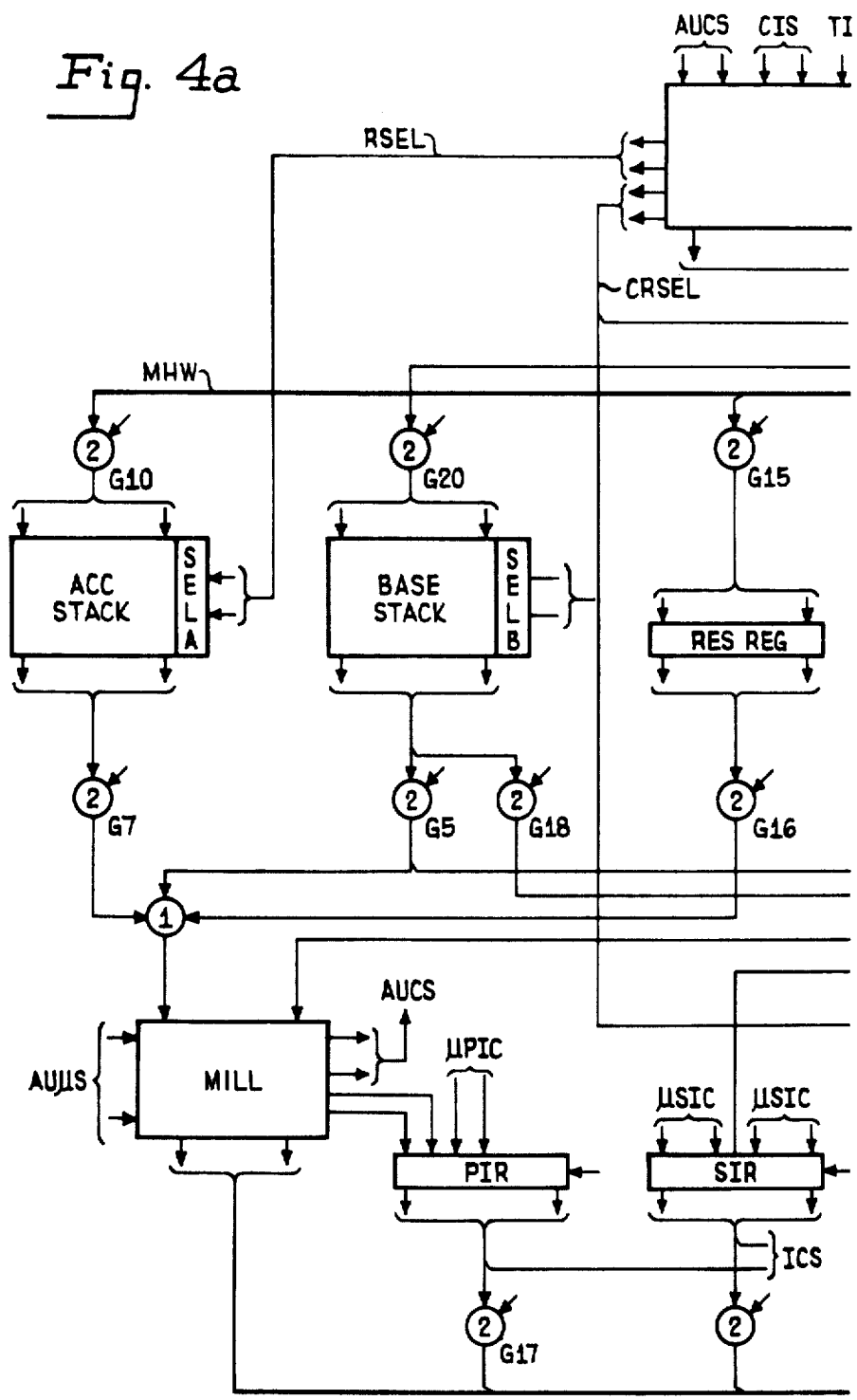
Figure 4B:
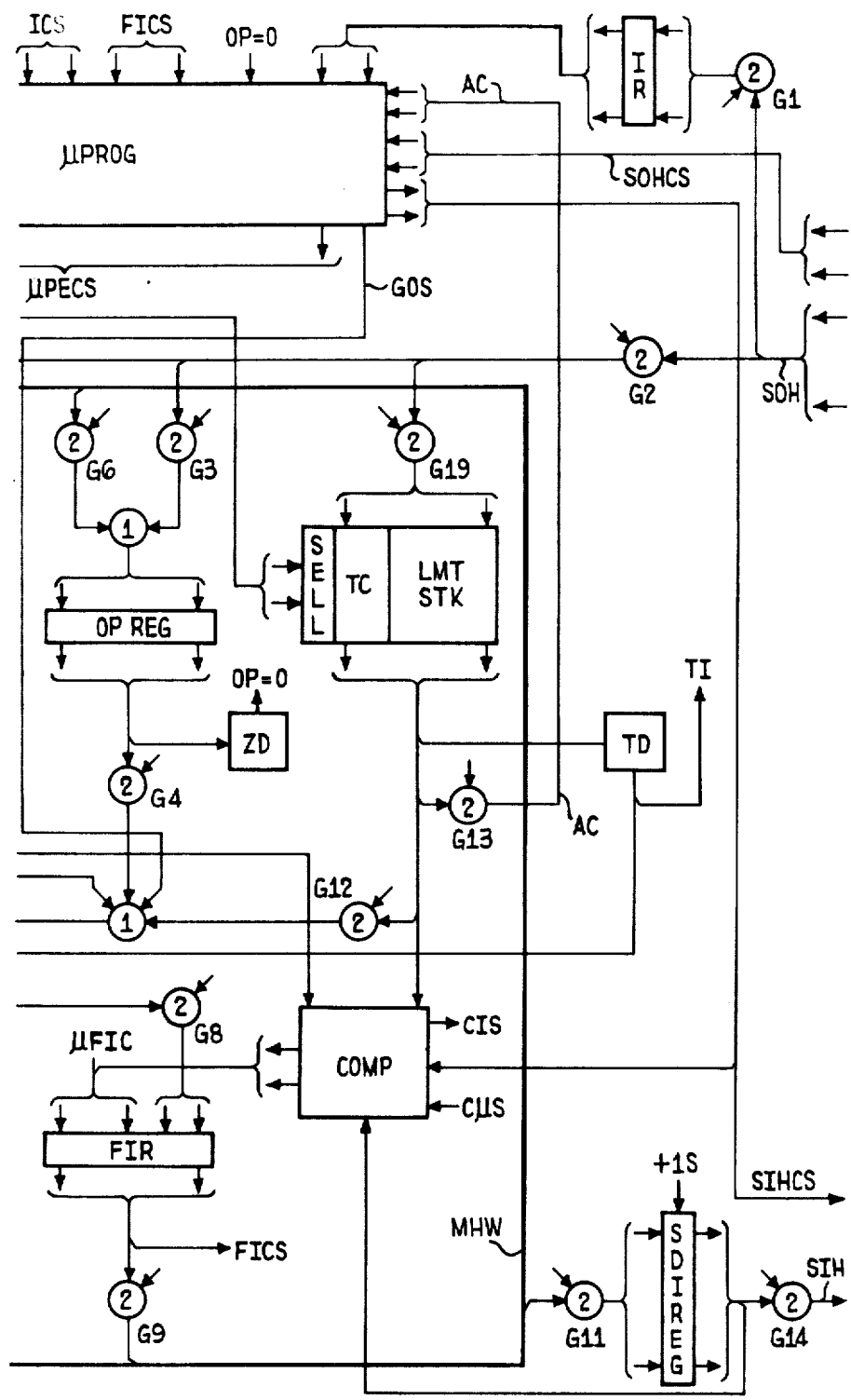
Figure 7:
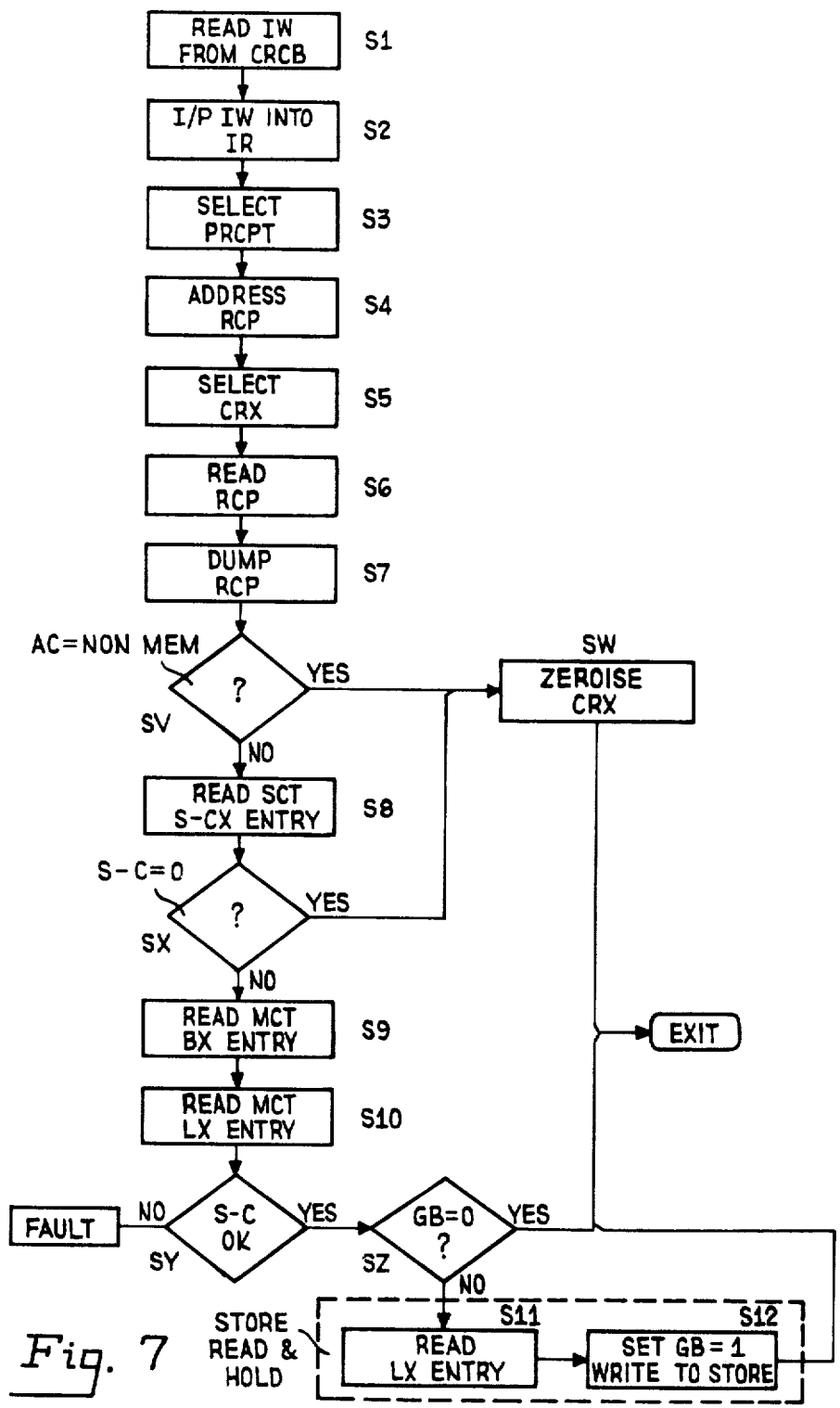
Figure 8:
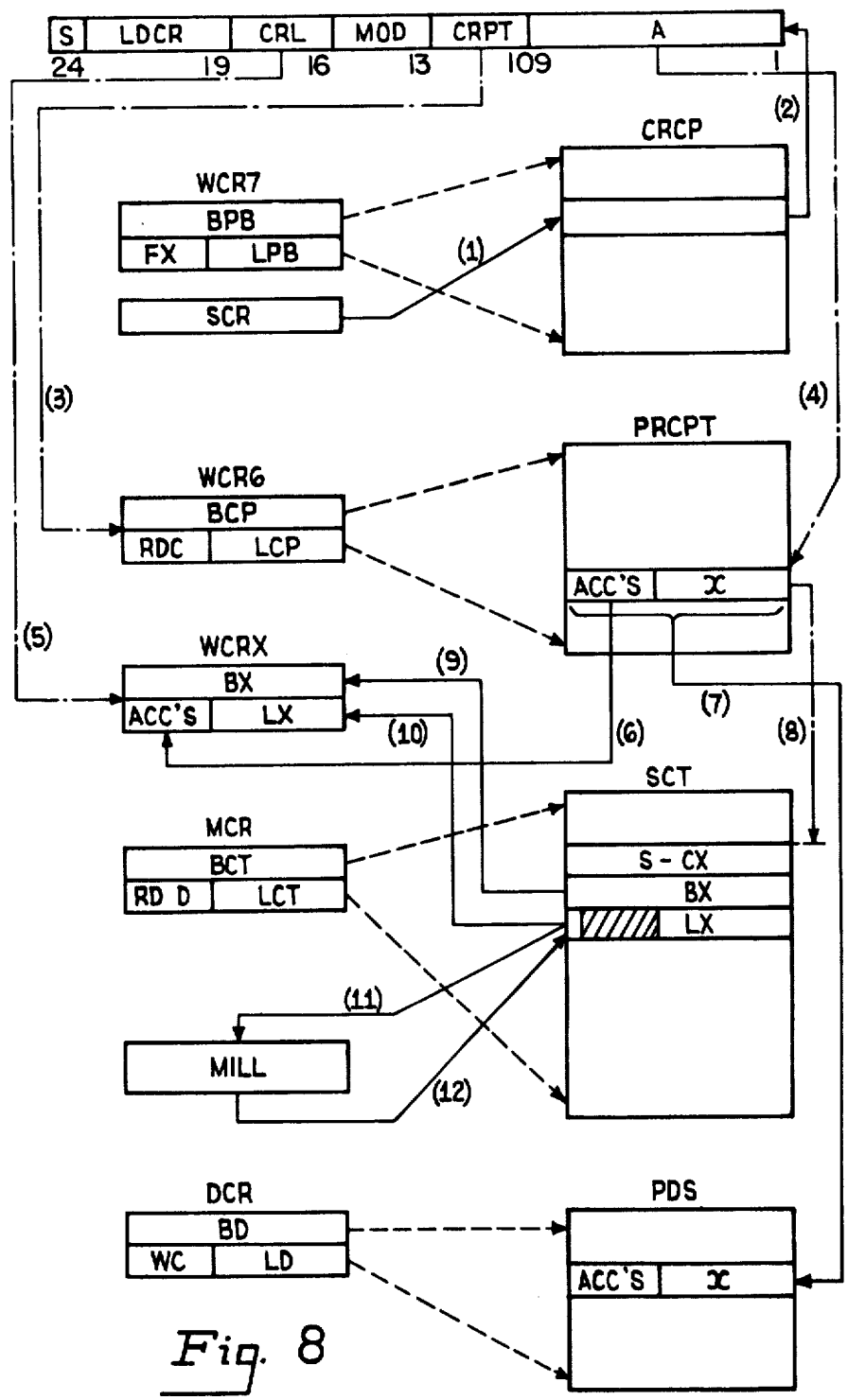

The invention will be more readily understood from the following description of one embodiment which should be read in conjunction with the accompanying drawings. Of the drawings:

FIG. 1 shows a simplified block diagram of a typical modular multi-processor system suitable for use with the embodiment of the invention, FIG. 2 shows in schematic form some of the system and process tables involved in the operations performed by a processor which are pertinent to the embodiment of the invention, FIG. 3 shows a flow diagram of the garbage collector algorithm according to the embodiment of the invention, FIGS. 4a and 4b show, when placed side by side with FIG. 4b on the right, a block diagram of a processor module suitable for use with the embodiment of the invention, FIG. 5 shows the layout of the accumulator stack of the processor module of FIGS. 4a and 4b, FIG. 6 shows the layout of the capability register stack of the processor module of FIGS. 4a and 4b, FIG. 7 shows the flow diagram of a "load capability register" instruction whereas FIG. 8 shows a schematic diagram of the operations performed when executing a "load capability register" instruction.

GENERAL DESCRIPTION

Referring firstly to FIG. 1 brief consideration will be given to a typical multi-processor data processing system organised on a modular basis and employing processor modules incorporating facilities suited to the preferred embodiment of the invention. The system consists typically of (i) a main memory including a number of storage modules SM1 to SM4, (ii) a number of processor modules CPUA, CPUB and CPUC, (iii) a number of peripheral units PU1, PU2 and PUA to PUN, and (iv) an intercommunication medium ICM for memory to processor or peripheral unit communication. The actual quantities of the various modules shown in FIG. 1 are typical only and are not intended to be limiting to the present invention.

Each processor module may be connected, by the intercommunication medium ICM, to any of the storage modules SM1 to SM4 and the memory MEM provides storage for all the applications and supervisory (control) programs and working and permanent data for each process. While performing a process a processor module is arranged to extend a demand to the intercommunication medium indicative of the memory address required and the intercommunication medium time-shares the access demands to the various storage modules.

Typically peripheral unit PU1 may be a disc store used as a backing store for the main memory MEM. In such circumstances it will be necessary from time to time to extract segments of information from the disc store and to insert them into defined areas of the memory MEM. Such an operation will be initiated by an input/output handler process which asynchronously executes the required disc-to-main memory transfers. Upon completion of the transfer the processor performing the process informs the system scheduler process there by permitting any processes which were suspended awaiting the completion of the transfer to be freed to continue. The operations of an interrupt system of the above type is disclosed in U.K. Pat. No. 1,332,797.

In a modular data processing system to which the invention is particularly suited, as has already been stated, the memory is arranged on a segmented basis. All program data and process working and permanent data is distributed in segmented form amongst the various storage modules of the system memory. Each processor module is provided with a plurality of so-called capability registers each arranged to hold a capability word relating to a memory segment to which the processor requires access in the performance of the current process. Such an arrangement is disclosed in U.K. Pat. No. 1,329,721.

Two of the capability registers in such a processor module are used to hold capability words relating to a so-called master (or system) capability table and a so-called reserved capability pointer table. The system capability table has one entry for each segment in the system memory and each entry includes information defining the base and limit addresses of the segment to which it relates. Thus the system capability table provides information on the location of the block in the memory for each information segment.

The preferred embodiment of the invention is suitable for use in a multi-processor system in which each processor module has no significant internal storage and has direct access to all the storage modules of the system memory. Each processor module is typically of the type defined in our U.K. Pat. No. 1,329,721 and the system generally is used in a real-time situation such as a telecommunications switching system provided with stored program control. In such a system the control algorithm may typically be divided into a plurality of applications programs, each dealing with a specific aspect of a telephone call set-up and switching-network administration procedure. At any one time more than one call may be at a similar stage of call set-up and consequently the same applications program may be in the course of execution by different processor modules concurrently. As a consequence it is necessary for the system control programs to be able to identify individually each "pass" of an application program for scheduling purposes for example. Typically each pass of each applications program is considered as a "process" and from a scheduling point of view an active process equates to a task to be performed. Each process is allocated its own unique so-called "dump-stack" and "reserved capability pointer table" at its inception. Each dump-stack provides a storage segment into which working parameters are dumped each time the process is suspended before reaching completion. The reserved capability pointer table defines all the system facilities required for the execution of the process. The system facilities include all the storage segments, both main memory segments and backing store segments, and all the system resources such as sub-routines relevant to computer peripheral equipment and the like necessary for the execution of the process. Each item in the reserved capability table defines a system facility. The reserved capability pointer table items which relate to memory segments comprise a "pointer" field and an "access code" field. The pointer defines relatively the first word of a three word entry in the system capability table defining the location of that segment in the memory whereas the access code defines the type of access (read only, read-write etc.) the process is to be permitted to that segment. The most significant two bits of the access code are used (when set to the 11 state) to define that the entry relates to a usable SCT slot. The reserved capability pointer table items which relate to system resources, such as a segment in backing store or the sub-routines used to "handle" accesses to computer peripheral devices etc., are arranged so that the "access" code field defines the resource type whereas the pointer field relates to the entry defining the particular resource. Typically the two most significant bits of the "access code" defines broadly the resource type.

Obviously some of the information segments will be common to a number of processes while others will be particular to a specific process.

The present invention makes use of spare capacity in an entry in the system capability table in the access code portion of the third word to provide for the full control of the allocation and deallocation of that segment and the SCT entry itself.

As mentioned previously the occurence of garbage in a modular memory system arises from the fact that explicit deallocation of storage segments is not obligatory. Accordingly a user process implicitly releases a storage segment when the user process loses all references to that storage segment. Since all references to storage segments are by way of the capability arrangements this means that the user loses all capabilities that refer to this piece of storage. For example, it will be assumed that the user has a block of store S as shown in FIG. 2 for which the user is allocated a single capability pointer which is preserved at offset $x$ in a reserved capability pointer table RCP. Now if the pointer RCP $(x)$ is the only pointer the user has for S and no other user has access to S then the user can implicitly release S simply by overwriting the pointer RCP $(x)$ in which case the user (or any other process) cannot access S by legitimate means. Segment S has now become garbage although there is no way for the operating system to know about it from the overwriting action of the user. It is important to remember that although the pointer has been overwritten the SCT entry remains so that the knowledge as to the size and location of S can be determined by examination of the SCT entry by a sufficiently privileged process. Clearly in the case above not only is S garbage but the slot SCT$(p)$ is no longer required. One of the aims of garbage collection is to search out such blocks and SCT entries. In exactly the same way S could consist of a block of capability pointers which is only referenced by CP$(x)$. If CP$(x)$ is the only pointer to S and the user overwrites it then as before entry P and store S are no longer accessible. It should be noted, however, that in this case it is possible that more than just P and S have been isolated since S is a block of capability pointers. Any unique pointers within S and the store they reference are clearly also isolated. These could themselves be further capability blocks. Hence, P could refer to an arbitarily complex data structure consisting of capability and data blocks and the overwriting of CP$(x)$ causes the isolation of all parts of that data structure that cannot be accessed by some path (within or out of the data structure) which starts outside the data structure.

At any given time the definition of what constitutes garbage is defined as that which cannot be accessed by any user in performing normal data structure traverses. Two points are worth noting:
 (i) the system routines which have data access to the SCT can access any part of the system since the system is entirely mapped into a capability structure and the SCT contains all capabilities — hence such routines are not considered to be performing "normal data structure traverses".
 (ii) this definition of garbage does not include such data structures as a user has finished with and not released explicitly or to which he has not destroyed all his pointers.

Before considering the garbage collection algorithm of FIG. 3 in detail it is advantageous to consider in outline the facilities provided by the processor module shown in FIGS. 4a and 4b.

The processor module includes an instruction register IR, a register stack of accumulator/working registers ACC STK, a result register RESREG, an operand register OPREG, a micro-program control unit μPROG, an arithmetic unit MILL, a comparator COMP, a memory data input register SDIREG a pair of memory protection (capability) register stacks BASE STK and TC/LMT STK and a set of machine indicator registers PIR (primary), SIR (secondary) and FIR (fault). Typically the three register stacks (ACC STK, BASE STK and TC/LMT STK) may be constructed using so-called scratch-pad units and these units are provided with line selection circuits (SELA, SELB and SELL respectively) which control the connection of the required "register" of the stack to the input and output paths thereof.

The processor unit is organised for parallel processing although for ease of presentation the various data paths have been shown as a single lead in FIGS. 4a and 4b. The processor module is provided with a so-called main highway MHW, a store input highway SIH and a store output highway SOH. Each of these highways is typically of 24 bits corresponding to a memory word and the store highways SOH and SIH have associated therein control signal highways SOHCS and SIHCS. These control signal highways are used to carry control signals between the processor module and the memory and they include a so-called timing wire and for highway SIHCS store access (read, read-write etc.) control wires. Although the memory is not shown in FIGS. 4a and 4b it is to be asumed that highways SIH and SOH are connected to the system memory over the system intercommunication medium. Hence highways SIH and SOH, together with their associated control signal highways SIHCS and SOHCS, collectively equate to a path such as SH shown in FIG. 1.

ACCUMULATOR STACK (ACC STK)

This scratch-pad unit is used to provide a number of accumulator registers, (ACC0–ACC7) which may also be used as masked registers or modifier registers, and the required one of the registers is selected by the code applied to leads RSEL either by micro-program control unit μPROG or by a register selection field or modifier select field in the instruction word in register IR. Also included in the accumulator stack ACC STK is a group of so-called hidden registers which include a sequence control register (SCR), an interrupt accept register (IAR), a machine fault indicator register (MFI) and a dump-stack-push-down-pointer register (DSPP) as shown in FIG. 5. The significance of these hidden registers will be seen later. The required register for any operation is selected by passing a selection code to the selection unit SELA (FIG. 4a) associated with the accumulator stack.

BASE REGISTER STACK (BASE STK)

This scratch-pad unit is used to provide a number of "half" capability register for the processor module. It was stated above that the memory protection system incorporates a number of so-called capability registers each of which holds a capability word consisting of a segment descriptor (base address and a limit address) and a permitted access type code. The base register stacks holds the base addresses for all capability registers. FIG. 6 on the left-hand side shows the half capability registers held in this stack and they consist of eight so-called "work-space" capability registers WCR0 to WCR7 and a number of so-called "hidden" capability registers. Only three of the hidden capability registers are shown (DCR, NICR and MCR) in FIG. 6 as these are the only hidden capability registers which are of importance in the understanding of the present invention. The workspace capability registers are selectable by selection code fields in the machine instruction register IR or by micro-program control signals whereas the hidden capability register are only selectable by special instruction word control codes and by micro-program generated selection codes.

The work-space capability registers are used to hold capability words which define some of the working areas of the memory to which the currently active process being executed by the processor module requires access. One of the work-space capability registers is used to hold a capability word which defines a "reserved capability pointer table" and by convention the reserved capability pointer table for the current process is defined by the segment descriptor held in WCR6.

The hidden capability registers are used to hold capability words which include segment descriptors which define the "administration" segments. Capability register DCR is the dump area capability register and the word therein defines the segment into which the parameters of the currently running process are to be dumped when the operations on this process are suspended. Capability register NICR holds a capability word whose segment descriptor defines a segment in which is stored a pointer which defines the capability for the dump stack for the system interrupt handler process. This pointer is accessed when an interrupt is forced by the trap detection circuit TD. Capability register MCR holds a segment descriptor for the segment in which the master capability table is located. The significance of all these segments and their segment descriptors will be seen later when considering the detailed operation of the system in accordance with the features of the invention.

Each base address of a capability register indicates (a) the store module (eight bits) in which the segment is located and (b) the base or start address of that segment within the storage module (sixteen bits).

TYPE CODE/LIMIT STACK (TC/LMT STK)

This stack provides the other "half" of the capability registers and it is shown on the right-hand side of FIG. 6. Each capability register is formed by a corresponding line in both the base stack and the limit stack. Each location in the TC/LMT STK stack stores the descriptor limit address and the permitted access code of the relevant capability word.

RESULT REGISTER (RES REG)

This register is fed from the process or module main highway MHW and may be used to temporarily store the result of an arithmetic operation.

OPERAND REGISTER (OPREG)

This register may be fed from either the main highway MHW or the memory output highway SOH and it is used as an intermediate register in the formation of a store access address. The offset address of an instruction word is fed into this register when an instruction word is fetched from the memory.

INSTRUCTION REGISTER (IR)

This register is used to hold the control bit fields of an instruction word when fetched from the memory. The significance of the various fields will be discussed later in the execution of a specific instruction.

MICRO-PROGRAM CONTROL UNIT (μPROG)

This unit controls the sequencing and performance of the operations of the processor module in the execution of each instruction step. The unit issues timed and sequenced equipment control signals (μPECS) to (i) activate as required the various register input AND gates by way of suitable signals on the unreferenced input leads to those gates, (ii) control the operation of the arithmetic unit MILL (leads AUμS), (iii) control the operation of the comparator COMP (lead C$\mu$s) and (iv) control the setting of some of the primary indicators (leads $\mu$PIC), the secondary indicators ($\mu$SIC) and the fault indicators ($\mu$FIC). The micro-program control unit is also able (i) to select various registers for use in a micro-sequence over leads CRSEL and RSEL, (ii) to increment the contents of the memory input register SDIREG (lead +1S) and (iii) to generate memory access control codes on the highway SIHCS and to activate that highway's timing wire. Various control and condition signals are generated within the rest of the processor module and fed to the micro-program control unit $\mu$PROG. These signals are shown as (a) leads AUCS, condition signals from the arithmetic unit MILL, (b) leads CIS, condition and indication signals from the comparator COMP, (c) leads ICS, indication signals from the primary and secondary indicator register PIR and SIR, and (d) leads FICS, indication signals from the fault indicator register FIR.

ARITHMETIC UNIT (MILL)

This unit is a conventional arithmetic unit capable of performing parallel arithmetic on the data words presented over its two input ports. Its result is connected over the main highway MHW to a micro-program defined destination. The actual operations performed by the MILL are defined by the arithmetic unit micro-program control signals AU$\mu$S. Certain condition signals, such as overflow, are generated by the MILL and these are fed either to the primary indicator register PIR or to the micro-program control unit $\mu$PROG (signals AUCS).

COMPARATOR (COMP)

This unit is used to compare the address loaded into the memory-data-input register SDIREG and the access operations required, with the bounds (i.e. base and limit) and permitted access code respectively of the capability word relevant to the memory access required. The condition indicating output signals CIS produced by the comparator are fed to the micro-program control unit $\mu$PROG. The significance of the comparator's function will be evident later.

MEMORY-DATA-INPUT REGISTER (SDIREG)

This register acts as the "CPU-to-memory" or processor module output register and address data or working data for passage to the memory is assembled in this register prior to its passage thereto over the memory input highway SIH.

PRIMARY INDICATOR REGISTER (PIR)

This register is used to hold eight primary indicators which require retention (in the process dump-stack) when a process is suspended. Typically the primary indicators include:

Bit 0 — Arithmetic result equal to zero
Bit 1 — Arithmetic result less than zero
Bit 2 — Arithmetic result overflow
Bit 3 — Write inverse parity
Bit 4 — Second group
Bit 5 — Interface faults inhibit
Bit 6 — Halt
Bit 7 — First attempt
Bits 8 to 23 — spare The first three indicators are affected by all data instructions whereas the remaining five indicators are manipulated by the internal hardware and certain control programs.

SECONDARY INDICATOR REGISTER (SIR)

This register is used to hold indicator bits mostly for use internally by the micro-program control unit $\mu$PROG. Typically this register includes arithmetic operation, fault control and interrupt indicators.

FAULT INDICATOR REGISTER (FIR)

This register is used to hold fault condition indicators and typically may have parity, "capability-field-violation" and "capability-access-field-violation" indicators included therein.

The garbage collection algorithm according to the embodiment of the invention is shown in FIG. 3 and it comprises eight basic steps referenced B1 to B8 inclusive. As mentioned previously each system capability entry, such as SCTE shown in the insert in FIG. 3, consists of three storage words. These words are (i) a SUMCHECK code, (ii) a BASE address and (iii) a LIMIT address. The limit address is relative to the base address and accordingly the most significant eight bits of this word are free.

The two most significant bits of the free zone of the limit address word of a system capability table entry are used to hold a garbage bit GB and a visited bit VB for the SCT entry and these bits are used by the garbage collection algorithm of the embodiment of the invention. The garbage bit GB is reset by the garbage collection algorithm and set by the performance of a "load capability register" instruction involving that SCT slot. The visited bit VB is set and reset by the garbage collection algorithm alone. The following description will be sectionalised under headings corresponding to the basic steps of the garbage collection process shown in FIG. 3.

As its inception the garbage collection process is allocated the following list of resources: (i) a "live store" flag, (ii) a next entry word, (iii) an SCT entry size constant value, (iv) SCT size constant value and (v) a pointer to a root node. Resources (i) to (iv) comprise storage segments and are therefore provided with SCT entries and accordingly have corresponding pointers in the reserved pointer table for garbage collection process whereas resource (v) is provided simply by a suitable pointer in the pointer table to the root node segment. A typical root node would be a basic table held by the system schedules process which identifies all the processes currently being handled by the system.

B1 SET ALL GB and VB TO 0

In this step the processor performing the garbage collection algorithm runs down all the SCT entries setting the garbage bit GB and the visited bit VB of each entry to zero. Typically the processor will perform a series of "SWAP MASKED" instructions each involving the LIMIT address entry of successive SCT entries. Before performing the first "swap masked" instruction a mask register, typically ACC0, is set-up in the processor module with a code of 11 in the two most significant bits and with '0' in all other bits while one of the other general purpose registers, say ACC1, is loaded with a code of all zero's. The "SWAP MASKED" instruction causes a character or bit pattern (selected by the mask register pattern) of the contents of the store location, selected by the address construction, to be interchanged between the location and an instruction word defined data register without disturbing the remaining contents of either the location or the register. The operation of reading from the storage location and writing back the new value takes place with the storage module locked-out to prevent simultaneous access from other processors. After each swap masked instruction the SCT entry address is incremented by the SCT entry size value (i.e. 3, there being three words in an entry). The SCT entry size value will of course already be set-up in one of the modifier register such as ACC2.

B2 LOAD CR with ROOT NODE

A "load capability register" instruction is performed in this step involving a capability block which is a root (within the operating system) for the entire system. This operation gives the garbage collection algorithm something to start with since it sets GB to 1 for an SCT entry which has VB = 0 and this will permit step B5 to be performed for that capability block. It should be noted that other real-time processes will currently be being performed and these will involve load capability instructions which of course will speed-up the operations of the garbage collection process.

The actual operations performed in a "load capability register" instruction are shown in FIGS. 7 and 8. The operations involved in the "load capability register" instructions are described in detail in United Kingdom Patent No. 1,329,721.

The drawing of FIG. 8 is provided with ten bracketed references and these indicate the ten basic steps of the load capability register micro-sequence a flow diagram of which is shown in FIG. 7. The various steps of FIG. 7 are referenced S1 to S10 to correspond to the bracketed references of FIG. 8 whereas the steps which are not depicted in FIG. 8 as they are internal processor operation steps are referenced SV, SW, SX, SY and SZ.

The following description will be sectionalised in accordance with the steps of FIG. 7 and reference to FIGS. 4a, 4b and 8 will frequently be made.

Step S1—Read IW from CRCB

In this step the program block CRCB (FIG. 8) of the current process is accessed for a read operation at the next instruction word by an address defined by the setting of the sequence control register SCR relative to the base address of capability register WCR7. In FIGS. 4a and 4b these operations are performed under control of the micro-program control unit μPROG by (i) selecting the SCR, using leads RSEL, (ii) selecting the capability register WCR7, using leads CRSEL, (iii) activating gates G18 and G7, (iv) instructing the arithmetic unit MILL to perform an add operation, (v) opening gates G11, (vi) activating the comparator COMP for access and limits tests and (vii) activating gates G14 and highway SIHSC. Path (1) of FIG. 8 shows diagramatically the operations of this step.

Step S2—I/P IW into IR

This step controls the gating into the processor module of the instruction word accessed in step S1. The micro-program control unit μPROG (FIG. 4b) will open gates G1, G2 and G3 when the timing wire on the memory output control signal highway SOHCS indicates that the word read from the memory (the instruction word in this case) is on the memory output highway SOH. The instruction word read is shown at the top of FIG. 8 and it consists of a number of administration fields (bits 10 to 24) and an address offset field A (bits 1 to 9). The administration fields define (a) at bits 10 to 12 (CRPT), the capability register WCR7 which relates to the reserved capability pointer table, (b) at bits 13 to 15 (MOD), the accumulator to be used as an address modifier register, (c) at bits 16 to 18 (CRL), the capability register to be loaded, (d) at bits 19 to 23 (LDCR), the function code which in this case defines the "load capability register" instructor and (e) at bit 24 (S), the direct or store operation bit. Path (2) of FIG. 8 shows diagramatically the operations of this step.

Step S3—Select PRCT

In this step the micro-program control unit μPROG in FIG. 2a conditions the CRSEL leads to select the working capability register defined by the CRPT field of the instruction word. This operation is shown by path (3) in FIG. 8.

Step S4—Address RCP

In this step the reserved capability pointer item address is formed and path (4) in FIG. 8 indicates this operation. The micro-program control unit μPROG activates gates G4 and G5, instructs the MILL to perform an add operation and activates gates G11 and G14. At the same time as gate G14 is actuated a read code is applied to highway SIHCS and the timing wire is activated.

Step S5—Select CRX

In this step the micro-program control unit applies the CRL field information to leads CRSEL of FIG. 4a to select the capability register (WCRX in FIG. 8) to be loaded. Path (5) in FIG. 8 depicts the operations performed in this step.

Step S6—Read RCP

In this step the reserved capability pointer item word (i.e. capability word access code and reserved capability pointer address offset) is fed into the processor module from the memory output highway SOH. The access code is fed into the TC section of the limit stack LIM STK at the location selected in step S5 whereas the whole word including the access code and the pointer address offset is fed into the operand register OPREG. These operations, depicted in FIG. 8 by path (6), are performed under micro-program control by activating gates G2, G3 and G19 of FIGS. 4a and 4b when the timing wire of the control signal highway SOHCS is activated.

Step S7—Dump RCP

In this step, depicted by path (7) of FIG. 8, the reserved capability pointer, resident in the operand register OPRWG (FIG. 4b) is copied into the current processor dump-stack at the location reserved for the capability register to be loaded. This operation is performed under micro-program control by (i) selecting, over leads CRSEL, the process dump-stack capability register DCR, (ii) activating gates G5, (iii) generating an offset address code on leads GOS defining the offset address of the word required in the dump-stack (iv) activating the MILL for an add operation, (v) activating gates G11 and G14 and (vi) accessing the memory for a write operation. The subsequent write operation involves the contents of the operand register which are applied over gates G4, G11 and G14 to the store.

Step SV—AC=Non-Mem?

In this step the access code fed, in step S6, into the TC section of the limit stack LIM STK is tested to see if it relates to a non-memory capability. If the capability pointer points to a non-memory pointer step SW is performed.

Step SW—Zeroise CRX

In this step capability register WCRX is again selected and gates G19 and G20 in FIGS. 4a and 4b are activated under micro-program control. This causes zero (the current output from the MILL on highway MHW) to be written into both halves of the capability register WCRX and the load capability register instruction microsequence is ended. Consequently if the access code as held in a reserved capability pointer table of any capability is other than that of a memory segment the entire contents, including the access code, of the corresponding capability register as it is to be loaded is reset to zero.

If the result of the test in step SV was no (i.e. lead TI=0) step S8 is performed.

Step S8—Read SCT S-CX entry

In this step the first word of the three word entry in the system capability table is read. This operation is depicted in FIG. 8 by path 8 and involves (i) the selection of capability register MCR, (ii) the actuation of gates G4 and G5, (iii) the actuation of the MILL for an add operation and (iv) the actuation of gates G11 and G14 under micro-program control. When the store read operation is complete gates G2 and G3 are opened and the sumcheck word is fed into the operand register. Gate G15 is also opened at this time to save the MCT address.

It was mentioned previously that each entry in the system master capability table (SCT in FIG. 8) is formed of three words. The first is arranged to be a sum-check code relevant to the other two words of the entry. When relocation occurs the relocating process indicates to the rest of the system that access to the segment involved is temporarily to be suspended by marking the system capability table entry. Typically the relocating process writes all zeros into the particular sum-check code word location. Hence as the sum-check code S-CX for the segment descriptor to be loaded into register WCRX is currently resident in the operand register, step SX is used to test to see if the segment is being relocated.

Step SZ—S-C=0?

The micro-program control unit μPROG (FIG. 4a and 4b) tests the state of lead OP=0 from the zero detector circuit ZD to see if the sum-check code is zero.

If lead OP=0 is in the "1" state step SW is performed before exiting from the load capability register microsequence. However, if lead OP=0 is in the "0" state step S9 is performed.

Step S9—Read MCT BX entry

In this step, shown by path 9 in FIG. 8, the base address of the master capability table entry is read into the base half of the capability register stack at the location defined by the CRL code field of the instruction word.

Step 10—Read MCT LX entry

In this step, depicted by path 10 in FIG. 8, the limit address of the system capability table entry is read into the limit half of the cpability register (WCR7) to be loaded. At the same time the received limit word of the SCT entry is fed into the operand register OPREG through gates G3.

Step SY—S-C OK

In this step the received sum-check value is checked against a locally generated sum-check value formed using the actual base and limit values loaded. If the received sum-check does not equal the locally generated sum-check value a fault condition is signalled. The actual operations involved are not shown in this description as they are not germane to the invention. However, it should be realised that as each part of the SCT entry is registered in the capability register the base and limit address values may be substracted from the sum-check and the result held in the result register RES REG. Gates G16 being used to present the part computed local sum-check to the MILL and the received address value parity thereof Gates G3 and G4 via the OPREG. Obviously if the result register does not contain zero at the end of this step a fault has occured.

Step SZ—GB=0

In this step the limit word of the SCT entry, currently in the OPREG is applied to the MILL, over gates G4 and the arithmetic unit condition signals AUCS are tested to see which of the most significant bit of that word is in the "1" state. If "yes" the garbage bit is set and the instruction is terminated. If the garbage bit is not "1" it must be set using steps S11 and S12 to indicate to the garbage collector process that the segment is not to be garbaged collected.

Step S11 READ LX entry

In this step the limit address entry is again read by opening gates G14 and setting the SIHCS leads to a "read and hold" condition. This ensures that steps S11 and S12 are performed with the store module, in which the SCT resides, locked. When the read operation is complete the received limit address word is fed via gates G2 and G3 into the OPREG.

Step S12—SET GB=1; WRITE TO STORE

The micro-program unit μPROG then conditions gates G4 to apply the contents of OPREG to the arithmetic unit and condition arithmetic unit control signals AUμS so that the most significant bit (i.e. garbage bit) in the word applied to the MILL is set to 1. The amended limit word is now applied over gates G11 to the SDIREG and then over gates G14 to the store with a WRITE operative command which terminates the Read and Hold operation on the store.

Returning now to FIG. 3 and the garbage collection process it can be seen that step B2 is terminated with at least one capability block (i.e. the root node) having its garbage bit set to the "1" state. Other load capability operations will have been performed in addition by other running processes.

B3—LIVE STORE; = FALSE; NEXT ENTRY = 2

The garbage collection process as mentioned previously is allocated, when scheduled to run, a stored "flag" called live store and a next entry counter segment. Accordingly this step involves (i) a "store data" instruction causing the store word holding the live store flag to be set to a false indication (i.e. zero) and (ii) a "load data" instruction causing the "next entry" segment to be loaded with decimal 2. This latter operation causes the value in the next entry segment to define the limit word of the first of the SCT entries.

B4—READ NE; GB=0? VB=1?

In this step the limit word of the next entry in the system capability table is read and the garbage bit (GB) and the visited bit (VB) of that word are tested. If the garbage bit (GB) of the entry is "1" it indicates that the segment descriptor for that segment has been loaded into a capability register since the garbage collection process last ran (i.e. the SCT entry relates to a "live store" segment). If the garbage bit is not set then the segment may be garbage but further tests must be made to see if the segment is itself a capability block. Accordingly the visited bit (VB) of the entry is tested and if this bit is set it indicates that the current run of the garbage collection process has visited (i.e. tested) this segment previously. If VB=0 it indicates that all the segments pointed to by this entry (if any) must be garbage bit set before moving on down the SCT. These operations are performed in step B5.

B5—VB:=1 etc.

VB is set to 1 in this step and, if the block is a capability pointer table block, all the garbage bits of the segments pointed to by the entries of the capability pointer block are set by performing a sequence of "load capability register" instructions each involving a separate pointer from the capability pointer block. It should be noted that the type of block (i.e. pointer table, data or read only program) is defined by a coding in the cross-hatched section of the SCT entry. When the entire capability pointer table block contents have been marked the "live store" flag is set to the "true" state.

B6—Inc. NE by SCT Entry size; NE>SCT Size?

In this step of the garbage collection process the next entry segment contents are increased by the value held in the "SCT entry size constant value" segment (i.e. NE is increased by decimal 3 there being three words in an SCT entry) and the increased contents are compared with the number of words in the SCT. If NE≮SCT size the complete SCT has been scanned; if NE<SCT then the loop involving, B4, B5 and B6 is traversed for each SCT entry having GB=1 and VB=0.

B7 LIVE ST?

In this step the state of the "live store" flag is interrogated, by reading the segment holding the flag. If the live store flag is true, step B3 is re-entered causing the algorithm to repeatedly scan the SCT in a linear fashion looking for live entries which have not been visited by the garbage collection process during its current run. If an entire SCT scan fails to find live entries or all live entries have been visited, step B7 will exit on the "no" line to step B8.

B8—Rescan SCT release all GB=0 entries

In this step the garbage collection process "frees" all entries having their garbage bits in the "0" state since these segments have not had their descriptors loaded into a capability register since the garbage collection process stated. Typically the segment area (base and limit addresses) is written into a store area free file and the pointer relative to the SCT entry to be freed is written into an SCT entry free list.

The use of the visited bit, however, ensures that the garbage collection process does not release any SCT entry until all active pointer tables have been searched. Accordingly even if a segment is not in current use (i.e. the descriptor is not loaded into a capability register) if that segment is pointed to by an active capability pointer table the garbage collection process forces the garbage bit of the "used" segment (or pointed—to segment) to the set state.

The live store flag is used in conjunction with the visited bit and this flag is "set" (i.e. made true) each time a live (GB=1) capability pointer segment is found which has not been visited. Hence, when a garbage collection scan is completed and live store is found reset (i.e. not true) all the live capability pointer segments must have been visited (i.e. all segments "pointed - to" by live capability pointer segments have had their garbage bits set to 1) and therefore all the slots having GB=0 must be genuine garbage.

The above description is of one embodiment only and is not intended to be limiting to the invention. Alternative arrangements will be seen by those skilled in the art for example the algorithm is described as a continuous process although in practice it will run periodically as a background supervisor process. The processor module described in the specification is typical only and obviously other processor modules having similar facilities could be employed. Also the "live store" flag has been described as being a software segment, however, it will be readily apparent to those skilled in the art that a discrete electronic toggle could be used to perform the same function. Further in the particular embodiment the SCT is already in existence and spare capacity is used for the garbage (GB) and visited (VB) indicator bits, however, a special table having one discrete entry for each store segment could be provided in which the two indicator bits above are held.

What we claim is:

1. A process for controlling the allocation and deallocation of memory space in a data processing system of the type including a plurality of processor units and at least one memory for holding information in segments, each segment including data, program code or lists of segments and each processing unit including a plurality of capability registers each arranged to store segment descriptor information indicative of the base and limit addresses in the memory of a segment and each processing unit further including capability register loading means and first means for addressing at a defined entry an information segment which contains a master capability table having an entry for each segment in the system, each entry including information defining the base and limit addresses of a corresponding segment together with a first and a second indicator bit and second means for reading the base and limit information from the defined entry addressed by said first means into the capability register to be loaded and third means for setting the first and second indicators in the defined entry addressed by said first means and, fourth means for testing the state of the first and second indicators wherein one of the processing units in the data processing system is arranged to perform periodically a sequence of operational steps to detect segments which are no longer being used, wherein said sequence comprises:
- a first step in which the first indicator and the second indicator of all master capability table entries are set to be a second state by said third means;
- a second step in which each master capability table entry is read in sequence by said second means and the state of the first indicator is tested by said fourth means and if the first indicator is in the first state the second indicator in the same status word is tested and if the second indicator is in the second state;
- a third step is performed in which each second indicator found by said fourth means, in the second step, to be in the second state is set by said third means to the first state and when the master capability table entry read is relative to a segment storing a list of segments the first indicator of the status word of each of those segments listed is set to the first state and
- a fourth step performed only when all entries in the master capability table have been processed by the second step and in which each master capability table entry is tested by said fourth means and a segment is indicated as suitable for release only if the first indicator thereof is in the second state.

2. The process as claimed in claim 1 wherein the first means for addressing includes a third indicator and wherein said sequence of operational steps performed by the said one of the processor units at the second step comprises the additional step of setting the third indicator to a first state each time a segment storing a list of segments is encountered in the performance of the second step.

3. The process as claimed in claim 2 in which the third indicator is set to the second state during the performance of the second step and the indicating operations of the third step are only performed when the third indicator is in the second state indicating that all segments storing lists of segments have had the first indicator of those segments set to the first state.

4. Apparatus for use in controlling the allocation and deallocation of memory space in a data processing system of the type including a plurality of processor units and at least one memory for holding information in segments, each segment storing data, program code or lists of segments and each processing unit including a plurality of capability register means each arranged to store segment descriptor information indicative of the base and limit memory addresses of a segment and each processing unit further including capability register loading means at least one of the processing units in the processing system is arranged to perform periodically a sequence of operational steps to detect segments which are no longer being used, said apparatus comprising:
- first means for addressing at a defined entry an information segment which contains a master capability table having an entry for each segment in the system, each entry including information defining the base and limit addresses of a corresponding segment together with a first and a second indicator bit;
- second means for reading the base and limit information from the defined entry addressed by said first means into the capability register to be loaded;
- third means for setting the first indicator in the defined entry addressed by said first means to a first state;
- fourth means for setting the first indicator and the second indicator of all master capability table entries to a second state;
- fifth means for reading each master capability table entry in sequence;
- sixth means for testing the state of the first indicator in each entry read by said fifth means for reading such that if the first indicator is in the first state the second indicator in the same status word is tested by said sixth means for testing and if the second indicator is in the second state an enabling signal is fed to a seventh means for setting wherein each second indicator found by said sixth means for testing to be in the second state is set to the first state and when the master capability table entry read is relative to a segment storing a list of segments the first indicator of the status word of each of those segments listed is set to the first state; and
- eighth means for testing, enabled only when all entries in the master capability table have been processed by said fifth, sixth and seventh means and in which each master capability table entry is tested and a segment is indicated by said eighth means for testing as suitable for release only if the first indicator thereof is in the second state.

5. Apparatus as claimed in claim 4 wherein said first means for addressing further includes a third indicator, said apparatus further comprising ninth means associated with said fifth means for setting said third indicator to a first state each time a segment storing a list of segments is encountered by said fifth means.

6. Apparatus as claimed in claim 5 further comprising tenth means for setting the third indicator to the second state during the operation of said ninth means and producing a signal whereby said eighth means is enabled only when the third indicator is in the second state indicating that all segments storing lists of segments have had the first indicator of those segments set to the first state.

* * * * *